United States Patent [19]

Lathrop

[11] 4,112,283

[45] Sep. 5, 1978

[54] DISTRIBUTOR CAP AND DUST SHIELD WITH HERMETIC SEALING AND MOISTURE DETECTION APPARATUS

[76] Inventor: James Lathrop, Rte. #1, Wayne City, Ill. 62895

[21] Appl. No.: 779,062

[22] Filed: Mar. 18, 1977

[51] Int. Cl.² .................... H01H 19/06; B65D 81/26
[52] U.S. Cl. .......................... 200/302; 116/114 AM; 200/19 DC; 206/204; 220/82 A; 312/31; 312/31.3; 350/66
[58] Field of Search .................. 206/204, 328; 312/31, 312/31.1, 31.2, 31.3; 200/237, 302, 303, 19 R, 19 A, 19 DR, 19 DC; 116/114 AM, 114 N; 350/66, 114; 252/184; 220/82 A

[56] References Cited

U.S. PATENT DOCUMENTS

| | | | |
|---|---|---|---|
| 2,086,522 | 7/1937 | Bergstrom | 200/19 DC |
| 2,446,361 | 8/1948 | Clibbon | 116/114 AM |
| 2,476,909 | 7/1949 | Ratz | 312/31.3 X |
| 2,548,168 | 4/1951 | Luce | 312/31.1 |
| 2,574,698 | 11/1951 | Hall | 200/302 X |
| 2,598,162 | 5/1952 | Guiot | 200/19 DC |
| 2,814,701 | 11/1957 | Rayer | 200/302 |
| 2,943,169 | 6/1960 | Rice | 200/302 X |
| 3,576,129 | 4/1971 | Crites | 350/114 |
| 3,660,626 | 5/1972 | Kawamura | 200/302 |

FOREIGN PATENT DOCUMENTS

| | | | |
|---|---|---|---|
| 437,139 | 10/1935 | United Kingdom | 350/66 |
| 496,614 | 3/1976 | U.S.S.R. | 200/302 |

*Primary Examiner*—James R. Scott
*Attorney, Agent, or Firm*—Leonard W. Suroff

[57] ABSTRACT

The spark ignition distributor cap assembly includes a distributor cap and a base with coupling means for removably securing the cap to the base during use of the ignition cap assembly. Sealing means is operatively associated with the cap and the base to provide a barrier therebetween so as to prevent liquid such as road water splash, or the like, from entering the interior of the cap and stalling the motor vehicle. Detecting means is operatively associated with the cap for indicating by visual means the moisture condition of the air within the cap. The detecting means comprises a chemical compound that changes its color when hydrated or percipitated, and housing means is mounted on the cap for receiving the detecting means therein.

24 Claims, 10 Drawing Figures

DISTRIBUTOR CAP AND DUST SHIELD WITH HERMETIC SEALING AND MOISTURE DETECTION APPARATUS

BACKGROUND OF THE INVENTION

This invention relates to internal combustion engine spark distributor caps and particularly to distributor caps having a sealing or leakproof means to inhibit moisture formation within the cap interior surface, thereby preventing failure of the cap during high-humidity engine operation. The invention also relates to detecting means to indicate the humidity of the air within the distributor cap.

There has been a long existent and bothersome problem of difficult engine starting during rainy spells or under high-humidity operating conditions, which problem has been found to center in the ignition distributor. This problem has been aggrevated in certain vehicle installations due to the fact that the distributor location in the vehicle engine compartment may have very little road water splash protection and/or air inlet apertures or ducting for the engine compartment tend to pass large volumes of moisture-saturated air around the distributor unit such that moisture is deposited on the exterior of and introduced to the interior of the distributor cap.

It has been determined that a major problem associated with high-humidity distributor operating conditions is conductivity of the cap interior surface. Such conductivity is promoted both by the inherent low electrical resistance of an aqueous film present on the cap interior surface and by the deterioration of that surface, resulting in an uneven sparking operation and ultimate failure of desired spark action.

Distributor cap conductivity resulting from deterioration of the cap interior surface is especially promoted by the presence of moisture-laden air within the cap during operating periods. At such times, undesirable electrical shorting that can occur (i.e., in moist atmosphere) between closely positioned high-tension contact studs stimulates the formation of a conductive film or path.

OBJECTS OF THE INVENTION

Accordingly, it is an object of this invention to provide a novel spark ignition distributor cap.

Another object of the present invention is to provide a novel spark ignition distributor cap including sealing means to prevent water from entering the cap.

Another object of this invention is to provide a new spark ignition distributor cap which visually indicates the formation of moisture within the cap.

Another object of the present invention is to provide a new spark ignition distributor cap assembly including means to inhibit the flow of water within the cap and on the cap interior surface.

Another object of the present invention is to provide a novel spark ignition distributor cap including both a detecting means to exhibit the formation of moisture within the cap and a means of preventing water from entering the cap.

Other objects and advantages of the present invention will become apparent as the disclosure proceeds.

SUMMARY OF THE INVENTION

The present invention provides for a spark ignition distributor cap assembly that includes a distributor cap comprising a cup-shaped member having an interior defined by an inner surface and an exterior defined by an outer surface with a circumferentially extending lower end intermediate the surfaces. A base having a circumferentially extending upper end adapted to receive the lower end of the distributor cap in overlapping relationship therewith is provided. Coupling means for removably securing the cap to the base during use of the ignition cap assembly is utilized.

Sealing means is operatively associated with the cap and the base to provide a barrier therebetween so as to prevent liquid such as road water splash, or the like, from entering the interior of the cap and stalling the motor vehicle. The sealing means comprises a plurality of circumferentially extending concentrically formed grooves on the cap, each one of the grooves having an inner end terminating below the lower end of the cap, and a plurality of circumferentially upwardly extending annular ribs formed on the base, each one of the ribs concentrically formed relative to each other and having a terminal end above the upper end of the base. The ribs are adapted to extend in interfitting relationship with each other when the coupling means secures the cap and the base in assembled relationship to each other.

Engaging means is operatively associated with each one of the ribs and the grooves. The engaging means comprises inclined surfaces on the ribs and the grooves for abutting engagement therebetween. Each one of the corresponding pair of inclined surfaces of each one of the mating ribs and grooves provides a sealing engagement therebetween such that a liquid barrier is obtained. The shape and contour of the engaging means varies with particular embodiments of the present invention.

The present invention also provides for a spark ignition distributor cap comprising a cup-shaped cap member having an interior defined by an inner surface and an exterior defined by an outer surface with a circumferentially extending lower end intermediate said surfaces. Detecting means is operatively associated with the cap for indicating by visual means the moisture condition of the air within the cap. The detecting means comprises a chemical compound that changes its color when hydrated or percipitated. Housing means is mounted on the cap for receiving the detecting means therein.

Mounting means is operatively associated with the housing means for permitting removal of the housing means from the cap so as to facilitate replacement of the detecting means. The mounting means may comprise a threaded aperture on the cap, and the housing means is threaded at one end thereof to be received in the threaded aperture.

The sealing means of the present invention also prevents dust or other foreign debris from entering the distributor cap by providing a plurality of mechanical barriers between the inner and outer surfaces of the cap.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
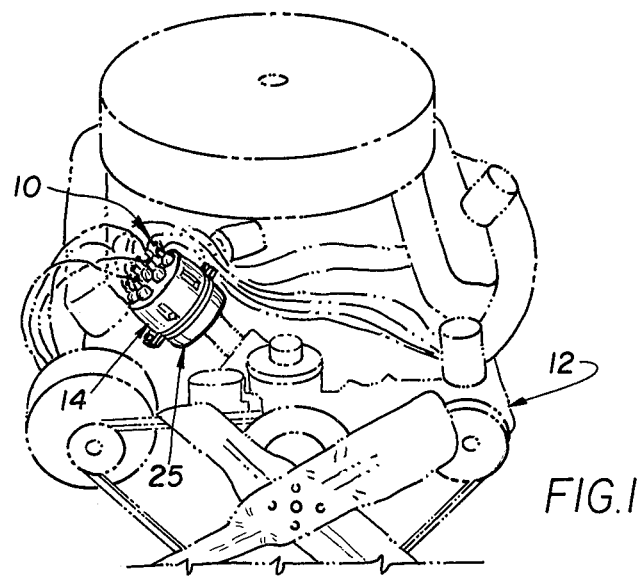
FIG. 1 is a perspective diagrammatic view of an automotive engine having the distributor cap assembly of the present invention associated in mounted relation thereto.
Figure 2:
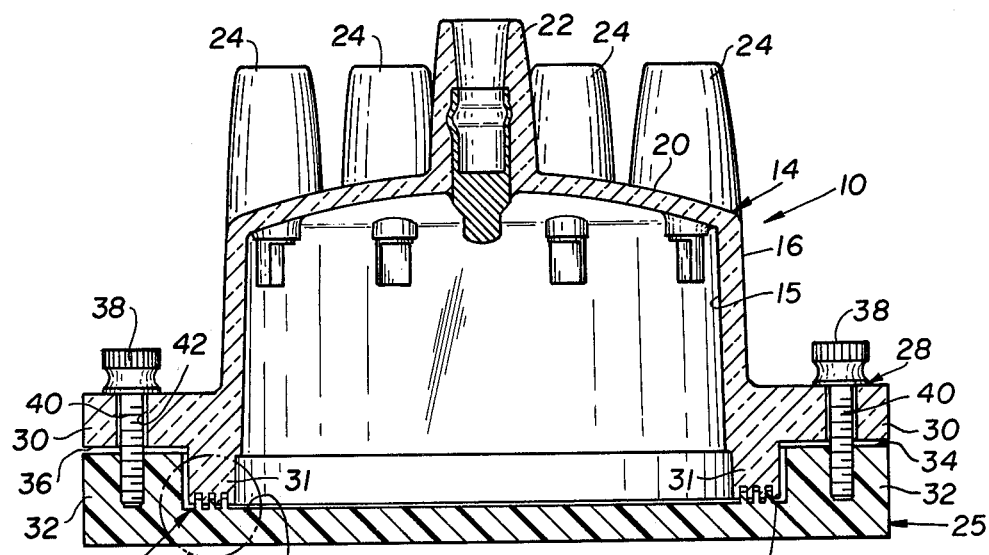
FIG. 2 is a sectional view illustrating the distributor cap assembly of the present invention.
Figure 3:
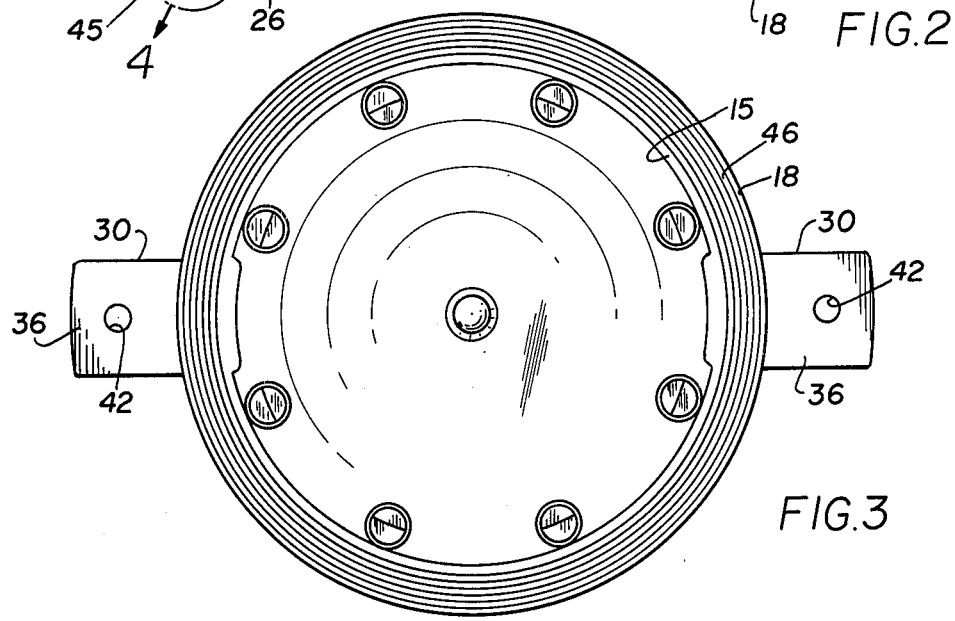
FIG. 3 is a bottom plan view of the distributor cap.

Referring to the drawings, there is illustrated in FIGS. 1-4 one embodiment of the present invention of a spark ignition distributor cap assembly 10 that is to be used in conjunction with a conventional motor, as illustrated in phantom in FIG. 1. The spark ignition distributor cap assembly 10 includes a distributor cap comprising a cup-shaped member 14 having an interior defined by an inner surface 15 and an exterior defined by an outer surface 16 with a circumferentially extending lower end 18 intermediate the surfaces 15 and 16.

The cap member 14 includes an upper or top surface 20 that may have extending therefrom a central tower 22 and a plurality of circumferentially spaced towers 24 in a manner well known in the art. These towers permit the necessary wires to extend therethrough in order for the assembly 10 to function in the manner well known in the art with the motor 12.

A base 25 having a circumferentially extending upper end 26 adapted to receive the lower end 18 of the distributor cap 14 in overlapping relationship therewith is provided. Coupling means 28 for removably securing the cap 14 to the base 25 during use of the ignition cap assembly 10 is utilized. The coupling means 28 may take various forms and include a peripherally extending flange 30 that extends outwardly from the outer surface 16 of the member 14. The base 25 may include an upwardly extending rim 32 having an upper surface 34 to extend adjacent to lower surface 36 of the flange 30.

The coupling means 28 may further include a fastener 38 having a threaded portion 40 adapted to extend through an aperture 42 within the flange 30 and into threads provided in the rim 32. In this manner the fasteners 38 are utilized to secure together the respective sections 14 and 25 of the assembly 10.

Figure 4:
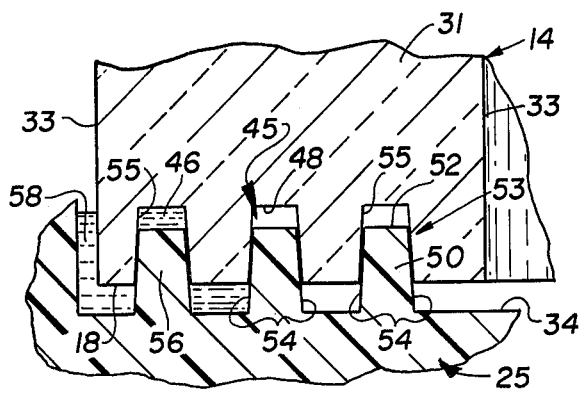
FIG. 4 is a fragmentary enlarged view of the sealing means utilized between the cap and base of the distributor cap assembly.
Figure 7:
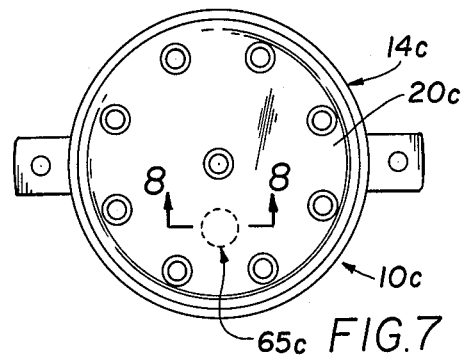
FIG. 7 is a top plan view of the distributor cap in accordance with another embodiment of the present invention.

In contrast to the prior art, there is further provided sealing means 45 operatively associated with the cap 14 and the base 25 to provide a barrier therebetween so as to prevent liquid such as road water splash, or the like, from entering the interior of the cap 14 and stalling the motor vehicle. With particular reference to FIG. 4, it will be seen that the sealing means 45 comprises a plurality of circumferentially extending concentrically formed grooves 46 on the cap 14. Each one of the grooves having an inner end 48 terminating below the lower end 18 of the cap 14, and a plurality of circumferentially upwardly extending annular ribs 50 formed on the base 25, each one of the ribs 50 concentrically formed relative to each other and having a terminal end 52 above the upper end 34 of the base 25. The ribs 50 and grooves 46 are adapted to extend in interfitting relationship with each other when the coupling means 26 secures the cap 14 and the base 25 in assembled relationship to each other.

The grooves 46 are provided within the downwardly extending annular lip or ring 31 that may be integrally formed with the cap 14. The cap 14 may be fabricated from a translucent material for reasons hereinafter described. The lip 31 extends between oppositely disposed side surfaces 33 that terminate at the lower end 18.

Engaging means 53 is operatively associated with each one of the ribs 50 and the grooves 46. The engaging means 53 comprises inclined surfaces 54 on the ribs 50 and inclined surfaces 55 on the grooves 46 for abutting engagement therebetween. Each one of the corresponding pair of inclined surfaces 54 and 55 of each one of the mating ribs 50 and grooves 46 provides a sealing engagement therebetween such that a liquid barrier is obtained.

The engaging means 53 is dimensioned so as to obtain a spacing between the lower end 18 and the upper end 34 when the cap 14 and the base 25 are assembled. In addition, the engaging means 53 is dimensioned so as to obtain a spacing between the terminal end 52 of each rib 50 and each inner end 48 of each groove 46.

In the embodiment of FIG. 4 the inclined surfaces 54 on each of the ribs 50 extend outwardly from the terminal end 52 at an angle of inclination towards the upper end or surface 34. In this manner the terminal end 52 is narrower than the bottom end or the root 56 of each rib 50. The angle of taper will vary and still provide the desired end result. The inclined surfaces 55 on each of the grooves 46 extend outwardly from the inner end 48 at an angle of inclination towards the lower end 18. The angle of inclination being substantially equal on the ribs 50 and the grooves 46, to provide an ideal fit therebetween. By providing a plurality of moisture barriers as disclosed herein, the efficiency of the assembly 10 is substantially increased over prior art devices. This feature is of particular importance in countries where high humidity is prevalent.

In the assembled relationship the coupling means 28 provides the necessary wedging engagement between the respective inclined surfaces 54 and 55. In this manner the desired sealing relationship of the sealing means 45 with the engaging means 53 is obtained. As illustrated in FIG. 4, three rows of ribs 50 and grooves 46 are provided. In this manner any liquid initially entering the area which, liquid 58 may be water splashed into the motor area by the motor vehicle going through a puddle, would be prevented from entering the interior of the cap 14. It is possible that a certain amount of liquid 58 will seep past one of the ribs 50, namely the outer one, but the liquid 58 would be prevented from gaining access to the interior of the spark ignition distributor cap assembly 10.

The inner end 48 of each groove 46 may extend at substantially the same depth in the cap 14. Furthermore, terminal end 52 of each rib 50 may extend above the upper end 34 at substantially the same height above the upper end 34. The dimensional relationship is such that the terminal ends 52 and the inner ends 48 may extend in substantially a horizontal plane. The ribs 50 and grooves 46 may be circular in shape so as to permit ease in assembly. When assembling the device, the person need only properly align the aperture 42 with the threaded aperture provided in the rim 32. Accordingly, the embodiment illustrated in FIGS. 1-4 provides a simple and efficient way of preventing fluid from entering the assembly 10 and disrupting the electrical contacts by wetting same.

Figure 5:
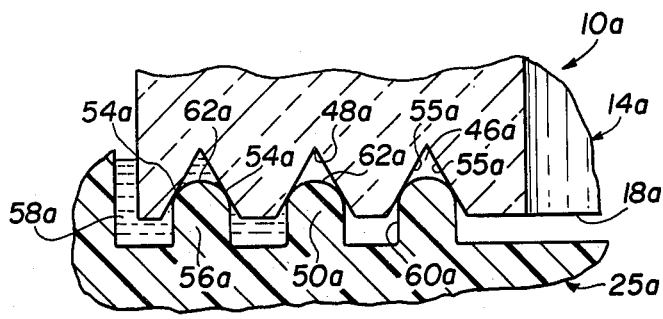
FIG. 5 is a view similar to FIG. 4 illustrating another embodiment of the present invention.

Referring now to FIG. 5 of the invention, there is provided an assembly 10a that is utilized to obtain the same desired end result of preventing fluid 58a from gaining entrance to the interior of the assembly 10a. In this embodiment each groove 46a is formed in a V-shaped configuration extending between the inner end 48a and the lower end 18a. The V-shaped groove is formed by the inclined surfaces 55a merging with each other at the inner end 48a.

The ribs 50a are formed with oppositely disposed spaced apart substantially vertically extending walls 60a. The walls 60a extend from the root 56a of each rib 50a and terminate in the inclined surfaces 54a. In the embodiment of FIG. 5 the inclined surfaces 54a form an arc 62a extending between the walls 60a and the arc 62a engages the V-shaped groove 46a in the cap 14a.

The ribs 50a and grooves 46a may be equidistantly spaced from each other and provide the necessary barrier for the fluid 58a. In this manner there is a minimal contacting surface area between each rib 50a and the inclined surfaces 55a of each groove 46a. This also permits the proper nesting relationship to readily take place when the cap 14a and base 25a are assembled with each other. The ribs 50a and grooves 46a, as well as the other combination of ribs and grooves, also act to prevent dust from entering the cap 10a which may also cause a malfunction of the motor vehicle.

Figure 6:
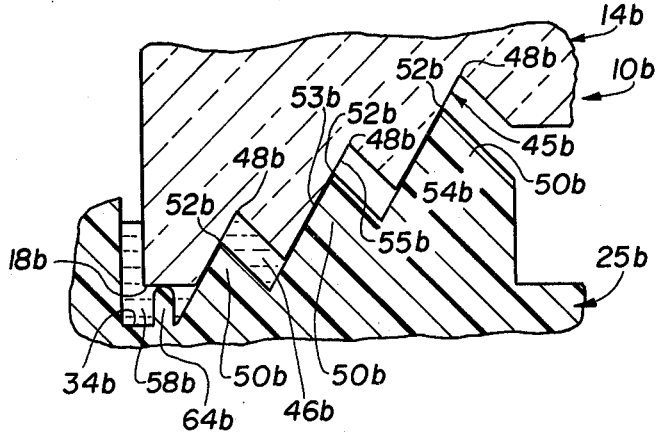
FIG. 6 is a view similar to FIG. 4 illustrating another embodiment of the present invention.

Referring now to FIG. 6, there is illustrated another embodiment of an assembly 10b in which the cap 14b is readily assembled with the base 25b. In contrast to the above embodiments, the ribs 50b and the grooves 46b form a series of steps extending upwardly and inwardly from the exterior surface 16b to the interior surface 15b of the cap 14b. In this embodiment each terminal end 52b extends above the elevation of the previously outwardly extending rib 50b.

As clearly illustrated in FIG. 6, three ribs 50b are illustrated and the terminal end 52b of the outer rib 50b is lower than the terminal end 52b of the innermost rib 50b. In similar manner each groove 46b is similarly dimensioned such that the inner end 48b is stepped upwardly as we move from the outer groove 46b to the inner groove 46b. In this manner one inclined surface 54b of each rib 50b engages a correspondingly inclined surface 55b of a respective groove 46b. This sliding contact will continue downwardly until the lower end 18b engages a shoulder 64b that may be provided to extend upwardly from the upper end 34b.

In a similar manner as explained above, fluid 34b may reach or extend beyond the outermost rib 50b. But, the end result will be that the engaging means 53b is sufficient to act as a barrier in conjunction with the sealing means 45b to prevent the entry of fluid to reach the electrical contacts within the assembly 10b.

Figure 8:
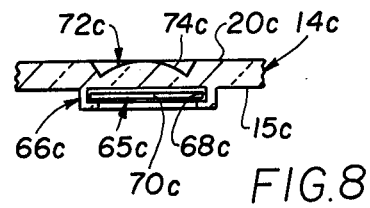
FIG. 8 is an enlarged fragmentary view in section taken along lines 8—8 of FIG. 7.

Referring now to FIGS. 7-10 of the present invention, there is provided an additional embodiment thereof which relates to providing detecting means 65c continued within the cap 14c for indicating by visual means the moisture condition of the air within the cap 14c. The detecting means 65c, as illustrated in FIG. 8, is provided on the interior surface 15c of the cap 14c and may include housing means 66c that may be integrally formed with the cap 14c. The housing means 66c is contained on the inner surface 15c and includes an aperture or slot 68c adapted to receive the detecting means 65c.

The detecting means 65c may include a detecting member 70c that is of a chemical composition that readily changes color with respect to the moisture content within the cap 14c. By providing the cap 14c from a translucent plastic material, at least in the area where the detecting member 70c, is situated, then visual observation readily determines the moisture content in the assembly 10c.

The detecting member 70c may be fabricated from a variety of chemical compositions well known in the art that changes in color with moisture. For example, cobaltous compounds become deep-blue when dehydrated and red when hydrated. Therefore, the use of chloride of cobalt contained within a proper member will provide the necessary visual indication to a person looking at the assembly 10c.

Accordingly, the cap 10c may be fabricated from a transparent plastic material that permits the person inspecting the vehicle to determine visually if a moisture buildup has occurred on the interior surface of the cap 10c. The transparent cap 10c may be provided with the embodiment illustrated in FIGS. 1-6.

To aid in the visual inspection from the top surface 20c, there may be provided magnifying means 72c on the outer surface 20c in overlapping relationship to the housing means 66c so as to obtain an easier indication of the color of the detecting means 65c. The magnifying means 72c being provided on the top 20c of the cap 14c so as to be readily visible. The magnifying means 72c is integrally formed with the cap 14c. To obtain the magnification, a lens surface 74c may be machined or otherwise formed on the top 20c to obtain the desired viewing assistance. The detecting member 70c may be changed from time to time as required.

Figure 9:
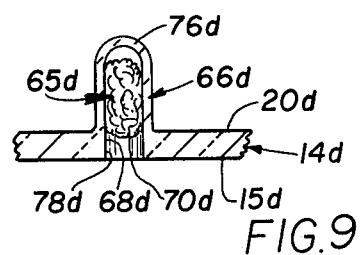
FIG. 9 is a fragmentary enlarged view in section illustrating another manner of providing for detecting means in accordance with the present invention.

Referring now to FIG. 9, there is illustrated housing means 66d that extends outwardly from the upper surface 20d of cap 14d and includes an elongated aperture or groove 68d to house the chemical compound within the detecting member 70d of the detecting means 65d. The housing means 66d may be in the form of a bulbous element 76d having an open end 78d on the interior surface 15d of the cap 14d. In this manner the change of color of the detecting element 70d is readily visible from various positions looking at the automotive engine.

Figure 10:
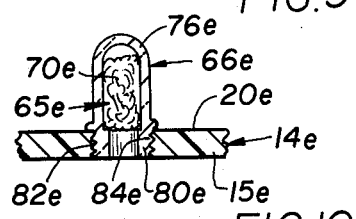
FIG. 10 is a view similar to FIG. 9 illustrating the modification thereof in which the housing means is removable.

FIG. 10 illustrates the housing means 66e to be fabricated in a manner such that one end 80e of the bulbous element 76e comprises a threaded portion 82e that mates with a threaded aperture 84e extending between the surfaces 15e and 20e. In this manner humidity or moisture changes within cap 14e are readily transmitted to the detecting element 70e and readily visible.

By providing the housing means 66e of a removable nature, the detecting element 70e may be readily changed without having to first disassemble the cap 14e from the base. In this manner it is possible to provide the means necessary to obtain a clear and easy indication of the moisture content within the cap 14e.

It is appreciated that the present invention may be provided with the detecting means alone such that replacement caps presently manufactured may be utilized on a base that presently is contained in previously manufactured automobiles. In similar fashion the invention may be utilized with the combined sealing and detecting means incorporated therein. This would be the case for newly manufactured automotive parts which could be incorporated into new models. In either event the end result is an improved distributor cap assembly to provide less maintenance to the end user.

By providing the detecting means in the manner illustrated it is possible when a motor vehicle has engine trouble to visually check the distributor without having to open same. By checking the color of the detecting member an immediate determination can be made if the distributor is the cause of the problem.

Although illustrative embodiments of the invention have been described in detail herein with reference to the accompanying drawings, it is to be understood that the invention is not limited to the precise embodiment and that various changes and modifications may be effected therein without departing from the scope or spirit of the invention.

I claim:

1. A spark ignition distributor cap assembly comprising in combination:
   A. a distributor cap comprising a cup-shaped member having an interior defined by an inner surface and an exterior defined by an outer surface with a circumferentially extending lower end intermediate said surfaces,
   B. a base having a circumferentially extending upper end adapted to receive said lower end of said distributor cap in overlapping relationship therewith,
   C. coupling means for removably securing said cap to said base during use of the ignition cap assembly,
   D. sealing means operatively associated with said cap and said base to provide a multiple barrier therebetween so as to prevent liquid such as road water splash or the like from entering the interior of said cap,
   E. said sealing means comprises:
      (1) a plurality of circumferentially extending concentrically formed grooves on said cap, each one of said grooves having an inner end terminating below said lower end of said cap, and
      (2) a plurality of circumferentially upwardly extending annular ribs formed on said base, each one of said ribs concentrically formed relative to each other and having a terminal end above said upper end of said base, said ribs adapted to extend in interfitting relationship with each other when said coupling means secures said cap and said base in assembled relationship to each other,
   F. engaging means operatively associated with each one of said ribs and said grooves, said engaging means comprising inclined surfaces on said ribs and said grooves for abutting engagement therebetween, each one of said corresponding pair of inclined surfaces of each one of said mating ribs and grooves providing sealing engagement therebetween such that a liquid barrier is obtained,
   G. detecting means operatively associated with said cap for indicating by visual means the moisture condition of the air within said cap when assembled with the base, said detecting means comprises a chemical compound that changes its color when hydrated or percipitated,
   H. housing means mounted on said cap for receiving said detecting means therein, and
   J. said housing means being contained on said inner surface and includes an aperture adapted to receive said detecting means therein.

2. An assembly as in claim 1, wherein said engaging means is dimensioned so as to obtain a spacing between said lower end and said upper end when said cap and said base are assembled.

3. An assembly as in claim 1, wherein said engaging means is dimensioned so as to obtain a spacing between said terminal end of each said rib and each said inner end of each said groove.

4. An assembly as in claim 1, wherein:
   a. said inclined surfaces on each of said ribs extend outwardly from said terminal end at an angle of inclination towards said upper end,
   b. said inclined surfaces on each of said grooves extend outwardly from said inner end at an angle of inclination towards said lower end, and
   c. said angle of inclination being substantially equal on said ribs and said grooves.

5. An assembly as in claim 4, wherein said inner end of each said groove extends to substantially the same depth in said cap.

6. An assembly as in claim 5, wherein said terminal end of each said rib extends above said upper end at substantially the same height above said upper end.

7. An assembly as in claim 4, wherein each one of said terminal ends and said inner ends extends in substantially a horizontal plane.

8. An assembly as in claim 1, wherein said inclined surfaces forming each one of said grooves are defined by a V-shaped configuration extending between said inner end and said lower end.

9. An assembly as in claim 8, wherein each one of said ribs includes a pair of oppositely disposed spaced apart walls extending outwardly from said upper end and terminating in said inclined surfaces.

10. An assembly as in claim 9, wherein said inclined surfaces form an arc extending between said walls, and said arc engages said V-shaped groove in said cap.

11. An assembly as in claim 1, wherein said cap is translucent such that moisture buildup on said inner surface thereof is visible exteriorly of the assembly.

12. An assembly as in claim 1, further including mounting means operatively associated with said housing means for permitting removal of said detecting means from said cap so as to facilitate replacement of said detecting means.

13. An assembly as in claim 12, wherein said mounting means comprises a threaded aperture on said cap and said housing means is threaded at one end thereof to be received in said threaded aperture.

14. A spark ignition distributor cap assembly comprising in combination:
   A. a distributor cap fabricated from a plastic material comprising a cup-shaped member having an interior defined by an inner surface and an exterior defined by an outer surface with a circumferentially extending lower end intermediate said surface, said cap being at least partially translucent to permit viewing through said surfaces,
   B. a base having a circumferentially extending upper end adapted to receive said lower end of said distributor cap in overlapping relationship therewith,
   C. coupling means for removably securing said cap to said base during use of the ignition cap assembly, D. sealing means operatively associated with said cap and said base to provide a multiple barrier therebetween so as to prevent liquid such as road water splash or the like from entering the interior of said cap, E. said sealing means comprises:
  (1) a plurality of circumferentially extending concentrically formed grooves on said cap, each one of said grooves having an inner end terminating below said lower end of said cap, and
  (2) a plurality of circumferentially upwardly extending annular ribs formed on said base, each one of said ribs concentrically formed relative to each other and having a terminal end above said upper end of said base, said ribs adapted to extend in interfitting relationship with each other when said coupling means secures said cap and said base in assembled relationship to each other, F. engaging means operatively associated with each one of said ribs and said grooves, said engaging means comprising inclined surfaces on said ribs and said grooves for abutting engagement therebetween, each one of said corresponding pair of inclined surfaces of each one of said mating ribs and grooves providing sealing engagement therebetween such that a liquid barrier is obtained, G. detecting means operatively associated with said cap for indicating by visual means the moisture condition of the air within said cap, said detecting means comprises a chemical compound that changes its color when hydrated or percipitated, H. housing means mounted on said cap for receiving said detecting means therein, said housing means including an aperture communicating with said inner surface for receiving said detecting means therein, I. mounting means operatively associated with said housing means for permitting removal of said detecting means from said cap so as to facilitate replacement of said chemical compound, J. said mounting means comprising a threaded aperture on said cap and said housing means is threaded at one end thereof to be received in said threaded aperture.

15. An assembly as in claim 14, wherein said housing means comprises a bulbous element having an open end communicating with said interior of said cap.

16. An assembly as in claim 14, further including magnifying means on said housing means so as to obtain an easier indication of the color of said detecting means.

17. An assembly as in claim 16, wherein said magnifying means being provided on top of said cap so as to be readily visable.

18. An assembly as in claim 14, wherein said engaging means is dimensioned so as to obtain a spacing between said lower end and said upper end when said cap and said base are assembled.

19. An assembly as in claim 14, wherein said engaging means is dimensioned so as to obtain a spacing between said terminal end of each said rib and each said inner end of each said groove.

20. A spark ignition distributor cap adapted to be assembled on a base, comprising:
A. a cup-shaped cap member fabricated from a plastic material and having an interior defined by an inner surface and an exterior defined by an outer surface with a circumferentially extending lower end intermediate said surfaces, B. detecting means operatively associated with said cap for indicating by visual means the moisture condition of the air within said cap when assembled with the base, said detecting means comprises a chemical compound that changes its color when hydrated or percipitated, C. housing means mounted on said cap for receiving said detecting means therein, D. said housing means being contained on said inner surface and includes an aperture adapted to receive said detecting means therein, and E. magnifying means on said outer surface in overlapping relationship to said housing means so as to obtain an easier indication of the color of said detecting means, said magnifying means being provided on top of said cap so as to be readily visible, and integrally formed with said housing means.

21. A distributor cap as in claim 20, further including mounting means operatively associated with said housing means for permitting removal of said housing means from said cap so as to facilitate replacement of said detecting means.

22. A distributor cap as in claim 21, wherein said mounting means comprises a threaded aperture on said cap and said housing means is threaded at one end thereof to be received in said threaded aperture.

23. A distributor cap as in claim 22, wherein said housing means comprises a bulbous element having an open end communicating with said interior of said cap.

24. A spark ignition distributor cap assembly comprising in combination:
A. a distributor cap comprising a cup-shaped member having an interior defined by an inner surface and an exterior defined by an outer surface with a circumferentially extending lower end intermediate said surfaces, B. a base having a circumferentially extending upper end adapted to receive said lower end of said distributor cap in overlapping relationship therewith, C. coupling means for removably securing said cap to said base during use of the ignition cap assembly, D. sealing means operatively associated with said cap and said base to provide a multiple barrier therebetween so as to prevent liquid such as road water splash or the like from entering the interior of said cap, E. said sealing means comprises:
  (1) a plurality of circumferentially extending concentrically formed grooves on said cap, each one of said grooves having an inner end terminating below said lower end of said cap, and
  (2) a plurality of circumferentially upwardly extending annular ribs formed on said base, each one of said ribs concentrically formed relative to each other and having a terminal end above said upper end of said base, said ribs adapted to extend in interfitting relationship with each other when said coupling means secures said cap and said base in assembled relationship to each other, F. engaging means operatively associated with each one of said ribs and said grooves, said engaging means comprising inclined surfaces on said ribs and said grooves for abutting engagement therebetween, each one of said corresponding pair of inclined surfaces of each one of said mating ribs and grooves providing sealing engagement therebetween such that a liquid barrier is obtained, and G. said ribs and said grooves form a series of steps extending upwardly and inwardly from said exterior to said interior of said cap, with each said terminal end of each one of said ribs extending above the elevation of the preceding one of said ribs, and said inclined surface of each one of said ribs and each one of said grooves being in abutting engagement with each other.

* * * * *